United States Patent
Friesen

(10) Patent No.: US 8,800,266 B2
(45) Date of Patent: Aug. 12, 2014

(54) METHOD FOR EXHAUST GAS-RECIRCULATION

(75) Inventor: Andreas Friesen, Hennef (DE)

(73) Assignee: DEUTZ Aktiengesellschaft, Cologne (DE)

(*) Notice: Subject to any disclaimer, the term of this patent is extended or adjusted under 35 U.S.C. 154(b) by 189 days.

(21) Appl. No.: 13/511,471

(22) PCT Filed: Dec. 17, 2010

(86) PCT No.: PCT/EP2010/007735
§ 371 (c)(1),
(2), (4) Date: May 23, 2012

(87) PCT Pub. No.: WO2012/082801
PCT Pub. Date: Jul. 14, 2011

(65) Prior Publication Data
US 2012/0279202 A1 Nov. 8, 2012

(30) Foreign Application Priority Data
Dec. 17, 2009 (DE) .................. 10 2009 058 713

(51) Int. Cl.
| F02M 25/07 | (2006.01) |
| F02D 41/00 | (2006.01) |
| F02D 41/24 | (2006.01) |
| F02D 21/08 | (2006.01) |
| F02D 41/14 | (2006.01) |

(52) U.S. Cl.
CPC .......... *F02D 41/005* (2013.01); F02D 2250/14 (2013.01); F02D 2041/1431 (2013.01); *F02D 41/0002* (2013.01); F02D 2250/12 (2013.01); F02D 41/146 (2013.01); *F02D 41/2451* (2013.01); F02D 41/2416 (2013.01); Y02T 10/42 (2013.01); *F02D 41/1461* (2013.01); Y02T 10/47 (2013.01); *F02D 41/1462* (2013.01); *F02D 21/08* (2013.01); F02D 2041/1433 (2013.01)
USPC .................. 60/278; 60/274; 60/276; 60/285

(58) Field of Classification Search
CPC .... F02M 25/0718; F01N 9/005; F01N 11/00; F01N 2560/026; F01N 3/20; Y02T 10/42; Y02T 10/47
USPC .................................. 60/274, 276, 278, 285
See application file for complete search history.

(56) References Cited

U.S. PATENT DOCUMENTS 5,365,733 A * 11/1994 Takeshima et al. ............. 60/278
6,109,025 A * 8/2000 Murata et al. ................... 60/297

(Continued)

FOREIGN PATENT DOCUMENTS

DE 100 00 339 A1 8/2001
DE 10256241 6/2004

(Continued)

OTHER PUBLICATIONS

"Verfahren der Abgsrueckfuehrung AGR," Lexikon Motortechnik, 1st edition, Apr. 2004, pp. 9 et seq., (see description in the specification).

*Primary Examiner* — Thomas Denion
*Assistant Examiner* — Jorge Leon, Jr.
(74) *Attorney, Agent, or Firm* — Davidson, Davidson & Kappel, LLC

(57) ABSTRACT

A method for exhaust gas recirculation (EGR), in particular in internal combustion engines, in particular for reducing NOx emission, by actuating an EGR valve (2) and/or a throttle flap (3), characterized in that during a predetermined period of time after determining an NOx value of the values for actuating the EGR valve (2) and/or the throttle flap (3) a mathematical model is employed, in which the currently determined NOx values, the period of time elapsed since completing the NOx measurement and the parameters relevant for the NOx reduction of the internal combustion engine (1) are included.

11 Claims, 2 Drawing Sheets

(56) References Cited

U.S. PATENT DOCUMENTS

| | | | |
|---|---|---|---|
| 6,216,452 B1* | 4/2001 | Naito et al. | 60/278 |
| 6,289,672 B1* | 9/2001 | Katoh et al. | 60/285 |
| 2002/0050135 A1* | 5/2002 | Manaka et al. | 60/277 |
| 2002/0112469 A1* | 8/2002 | Kanazawa et al. | 60/285 |
| 2002/0144501 A1* | 10/2002 | Uedahira et al. | 60/278 |
| 2004/0045280 A1* | 3/2004 | Nishiyama et al. | 60/278 |
| 2004/0084031 A1* | 5/2004 | Ito et al. | 123/568.21 |
| 2006/0086080 A1* | 4/2006 | Katogi et al. | 60/278 |
| 2009/0158706 A1 | 6/2009 | Sun | 60/274 |
| 2009/0158710 A1* | 6/2009 | Suzuki | 60/285 |
| 2010/0131181 A1 | 5/2010 | Herrmann | 701/108 |
| 2010/0211293 A1* | 8/2010 | Yamada et al. | 701/108 |
| 2010/0251698 A1* | 10/2010 | Hiranuma et al. | 60/278 |

FOREIGN PATENT DOCUMENTS

| | | |
|---|---|---|
| DE | 10 2008 008618 A | 6/2009 |
| FR | 2847941 | 6/2004 |
| GB | 2460397 | 12/2009 |
| WO | WO 2008/131789 A1 | 11/2008 |

* cited by examiner

METHOD FOR EXHAUST GAS-RECIRCULATION

BACKGROUND

To comply with NOx emission limits for current and future emission levels, the Method for Exhaust-Gas Recirculation (EGR) known, inter alia, from the encyclopedia *Motortechnik* (Engine Technology), 1st edition, April 2004, p. 9 ff., is used.

SUMMARY OF THE INVENTION

This means that the exhaust gas from the engine is cooled by a system provided for that purpose and is returned in defined quantities to the induction tract of the engine. The NOx emissions can be thereby significantly lowered, this tending to result, at the same time, in an increase in particulate matter emissions. The low limits for NOx and particulate matter emissions compel the engine manufacturers to adapt their engines to operate only very slightly below the mandatory limits. At the same time, it is necessary to ensure that the aging-induced change in the system components and the production variance thereof does not result in exceedance of the limiting values. A practical procedure derived therefrom is to use the EGR to control the NOx emissions to the required value. To permit adjustment of the NOx emissions, it is necessary to ascertain the emitted NOx as accurately as possible. However, all of the commercially available NOx sensors for use in production engines are only suited for measuring, respectively controlling NOx emissions in steady-state engine operation, and not in transient operations. The reason for this is the relatively substantial response time, respective delay time inherent in these sensors relative to the speed and load changes in transient engine operation. In control engineering, response time (also referred to as propagation delay or transport time) is described as the period of time between the change at the system input and the response at the system output of a controlled system. The delay time is described, for example, as the filter constant of a PT1 filter. To deal with this problem, the NOx emission is estimated in transient operation using a mathematical relationship among different variables. Since all of the components and measuring devices of this system are subject to fault tolerances and aging effects, the NOx estimator must be individually corrected for the propagation delay for each engine. The correction is performed under steady-state operating conditions using the NOx values measured correctly under steady-state conditions by the NOx sensor, which are compared to those of the estimator. In transient engine operation, steady-state deviations between the sensor value and the estimate likewise result in a deviation of the emissions in the same direction. The NOx estimator or also the physical model contain(s) characteristics maps and algorithms that make it possible for the actual NOx emissions to be inferred from current measured values (various sensors on the engine) and from the reference values mapped in the characteristic maps, even during transient engine operation. Thus, the NOx control is possible even during transient operations.

If the operating state of the engine is virtually steady-state, the value of the estimator is compared to that of the NOx sensor. In the case of a deviation, the reference values of the estimator are corrected to allow the desired NOx emissions to remain exactly within the bounds of the measuring accuracy of the NOx sensor. This correction value must then be stored for this operating point in order to have a corrective effect even in transient engine operation, during which the NOx sensor again does not yield any reliable values.

It is an object of the present invention to provide a method to implement operating point-dependent storage of the correction value as a characteristics map. This type of correction effectively counters the aging-induced change in NOx emissions and an excessive production variance.

In technical applications, operating point-dependent states, respectively values are often determined as a function of one or a plurality of variables. A method for mathematically describing and storing such a relationship is constituted of a characteristics map having one axis each for the dependence of the input variables and a matrix for the output variable. In processor-based real-time applications, the axes have a predefined number of data points for the particular input variable. The values of the data points must be strictly monotonic. Dimension n*m of the output matrix is defined by number n of the data points of axis i and number m of the data points of axis y. Thus, an element from the output matrix may be uniquely assigned to each value pair of the x data point value and y data point value. The pairings of the x and y input values are described as the operating point. Such characteristic maps are typically parameterized by measurements at the test stand, in the laboratory or also using calculated values. The operating points are selected to allow the individual data point values to be precisely reached by the input variables and, thus, only one element of the output matrix to be value-determining. In the example shown in mapping 1, input variable x has value "90," and input variable y value "400." As shown in mapping 4, the thereby value-determining element of the output matrix has value "5."

If, at this point, the input variable values do not coincide exactly with the values of the data points, but are therebetween (for example, x=80.2 and y=1787), the corresponding output value (z=7.103) must be determined by linear interpolation. The value sought is calculated from the four values of the output matrix that include the operating point as shown in mapping 5. This means that the weighting of the four individual values is dependent on the particular distance from the operating point.

On the other hand, the intersections of the lines among themselves and the intersections of the lines with the axes indicate the individual elements of the output matrix.

The problem entailed in storing the correction value for the reference value used by the estimator is that the ascertained value of the error is not directly assignable to an element of the output matrix, since, typically, the input variables do not reside precisely on a data point value. Thus, useful values are sought for those elements of the output matrix that include the current operating point. For an operating point having the corresponding output value, a theoretically infinite number of value combinations may be found for the individual elements which represent the output value in the case of a linear interpolation. Thus, the problem formulation is initially focused on finding the value combination that also represents an optimal approximation of the particular correction value for the other operating points within the same elements of the output matrix.

Only in exceptional cases are the values of the elements in question able to be determined directly in the first step without requiring further correction. In the case of an operating point displacement, the previously determined values must typically be corrected once more to permit precise mapping of the new value as well.

The change in the values of the elements of the output matrix is converted in a way that allows the element most heavily weighted for the particular operating point to also undergo the greatest change. Analogously thereto, the least heavily weighted element also undergoes the smallest change. The new values for the output matrix elements are not only determined as a function of the new value, but also as a function of historical values. Thus, the characteristic map learns the required correction of the estimator, while taking all previous situations into account.

The following equations describe the learning relationship mathematically.

Mathematical Description of the Adaptation

Identification of the Output Matrix Elements

In the following executions, a, b, c and d, respectively a', b', c' and d' are assumed to be those output matrix elements that include the current operating point. Each element of the output matrix may influence the output value. The same element may either participate not at all, since it does not directly include the operating point in question, or may also participate in the interpolation as a, b, c or d. Thus, it is absolutely essential that the element be uniquely identified as a, b, c or d, depending on the operating point, to enable the correct value to be stored in the corresponding element. The elements may be identified in this manner by comparing the row and column index of the elements. For purposes of the interpolation, the corresponding elements are already identified by the weighting factor thereof. Thus, it is known which elements participate in the interpolation. For the subsequently described method, it is still to be determined whether an element is participating as a, b, c or d.

Element $a_{j,k}$ is to be considered:

Case 1: Besides $a_{j,k}$, elements $a_{j,k+1}$, $a_{j+1,k}$ and $a_{j+1,k+1}$ also participate in the interpolation→$a_{j,k}$=a in mapping 4.

| | | | | x | | | |
|---|---|---|---|---|---|---|---|
| y | 20 | 50 | 60 | 70 | 90 | 100 | 150 |
| 100 | 2 | 5 | 2 | 5 | 2 | 5 | 20 |
| 200 | 3 | 6 | 3 | 6 | 3 | 6 | 30 |
| 300 | 4 | 7 | 4 | 7 | 4 | 7 | 40 |
| 400 | 5 | 8 | 5 | 8 | $a_{j,k}$=5 | 8 | 50 |
| 500 | 6 | 9 | 6 | 9 | 6 | 9 | 60 |
| 800 | 7 | 10 | 7 | 10 | 7 | 10 | 70 |
| 1500 | 8 | 5 | 8 | 5 | 8 | 5 | 80 |
| 2000 | 9 | 4 | 9 | 4 | 9 | 4 | 90 |
| 3000 | 10 | 3 | 10 | 3 | 10 | 3 | 100 |

Mapping 4: Schematic Representation Case 1

Case 2: Besides $a_{j,k}$, elements $a_{j,k-1}$, $a_{j+1,k}$ and $a_{j+1,k-1}$ also participate in the interpolation→$a_{j,k}$=b in mapping 5.

| | | | | x | | | |
|---|---|---|---|---|---|---|---|
| y | 20 | 50 | 60 | 70 | 90 | 100 | 150 |
| 100 | 2 | 5 | 2 | 5 | 2 | 5 | 20 |
| 200 | 3 | 6 | 3 | 6 | 3 | 6 | 30 |
| 300 | 4 | 7 | 4 | 7 | 4 | 7 | 40 |
| 400 | 5 | 8 | 5 | 8 | $a_{j,k}$=5 | 8 | 50 |
| 500 | 6 | 9 | 6 | 9 | 6 | 9 | 60 |
| 800 | 7 | 10 | 7 | 10 | 7 | 10 | 70 |
| 1500 | 8 | 5 | 8 | 5 | 8 | 5 | 80 |
| 2000 | 9 | 4 | 9 | 4 | 9 | 4 | 90 |
| 3000 | 10 | 3 | 10 | 3 | 10 | 3 | 100 |

Mapping 5: Schematic Representation Case 2

Case 3: Besides $a_{j,k}$, elements $a_{j-1,k+1}$, $a_{j-1,k}$ and $a_{j,k+1}$ also participate in the interpolation→$a_{j,k}$=c in mapping 6.

| | | | | x | | | |
|---|---|---|---|---|---|---|---|
| y | 20 | 50 | 60 | 70 | 90 | 100 | 150 |
| 100 | 2 | 5 | 2 | 5 | 2 | 5 | 20 |
| 200 | 3 | 6 | 3 | 6 | 3 | 6 | 30 |
| 300 | 4 | 7 | 4 | 7 | 4 | 7 | 40 |
| 400 | 5 | 8 | 5 | 8 | $a_{j,k}$=5 | 8 | 50 |
| 500 | 6 | 9 | 6 | 9 | 6 | 9 | 60 |
| 800 | 7 | 10 | 7 | 10 | 7 | 10 | 70 |
| 1500 | 8 | 5 | 8 | 5 | 8 | 5 | 80 |
| 2000 | 9 | 4 | 9 | 4 | 9 | 4 | 90 |
| 3000 | 10 | 3 | 10 | 3 | 10 | 3 | 100 |

Mapping 6: Schematic Representation Case 3

Case 4: Besides $a_{j,k}$, elements $a_{j,k-1}$, $a_{j-1,k}$ and $a_{j-1,k-1}$ also participate in the interpolation→$a_{j,k}$=d in mapping 7.

| | | | | x | | | |
|---|---|---|---|---|---|---|---|
| y | 20 | 50 | 60 | 70 | 90 | 100 | 150 |
| 100 | 2 | 5 | 2 | 5 | 2 | 5 | 20 |
| 200 | 3 | 6 | 3 | 6 | 3 | 6 | 30 |
| 300 | 4 | 7 | 4 | 7 | 4 | 7 | 40 |
| 400 | 5 | 8 | 5 | 8 | $a_{j,k}$=5 | 8 | 50 |
| 500 | 6 | 9 | 6 | 9 | 6 | 9 | 60 |
| 800 | 7 | 10 | 7 | 10 | 7 | 10 | 70 |
| 1500 | 8 | 5 | 8 | 5 | 8 | 5 | 80 |
| 2000 | 9 | 4 | 9 | 4 | 9 | 4 | 90 |
| 3000 | 10 | 3 | 10 | 3 | 10 | 3 | 100 |

Mapping 7: Schematic Representation Case 4

If none of these cases applies, then $a_{j,k}$ is neither a, b, c nor d, and does not participate in the current learning process.

Equations for Adapting the Output Matrix

The assumption is that the equations for determining weighting factors ga, gb, gc and gd are generally known, so they are not mentioned separately.

The "old" output value is determined from the individual "old" output matrix elements a, b, c and d using weighting factors ga, gb, gc and gd as follows (linear interpolation):

$$Z = a \times ga + b \times gb + c \times gc + d \times dg \tag{6.1}$$

The "new" output value Z' is determined from the individual "new" output matrix elements a', b', c' and d' using weighting factors ga, gb, gc and gd as follows (linear interpolation):

$$\dot{Z} = \dot{a} \times ga + \dot{b} \times gb + \dot{c} \times gc + \dot{d} \times gd \tag{6.2}$$

The "new" values of the output matrix elements are ascertained as follows:

$$\dot{a} = a + \Delta a \tag{6.3}$$

$$\dot{b} = b + \Delta b \tag{6.4}$$

$$\dot{c} = c + \Delta c \tag{6.5}$$

$$\dot{d} = d + \Delta d \tag{6.6}$$

if the sum of the implemented change to the old values is defined as:

$$\Delta G = \Delta a + \Delta b + \Delta c + \Delta d \tag{6.7}$$

The following equations describe the intention to implement the magnitude of the change in the values in the output matrix elements as a function of the level of the weighting for the interpolation:

$$\Delta a = ga * \Delta \dot{G} \quad (6.8)$$

$$\Delta b = gb * \Delta G \quad (6.9)$$

$$\Delta c = gc * \Delta G \quad (6.10)$$

$$\Delta d = gd * \Delta G \quad (6.11)$$

The difference in output value $\Delta Z = Z' - Z$ may also be described by the following equation.

$$\Delta Z = ga \times \Delta a + gb \times \Delta b + gc \times \Delta c + gd \times \Delta d \quad (6.12)$$

Inserting equations (6.8) through (6.11) into equation (6.12), one ultimately obtains:

$$\Delta G = \frac{\Delta z}{(ga)^2 + (gb)^2 + (gc)^2 + (gd)^2} \quad (6.13)$$

This makes it possible for $\Delta a$, $\Delta b$, $\Delta c$ and $\Delta d$, ultimately also for a', b', c' and d' to then be determined.

DETAILED DESCRIPTION

Figure 1:
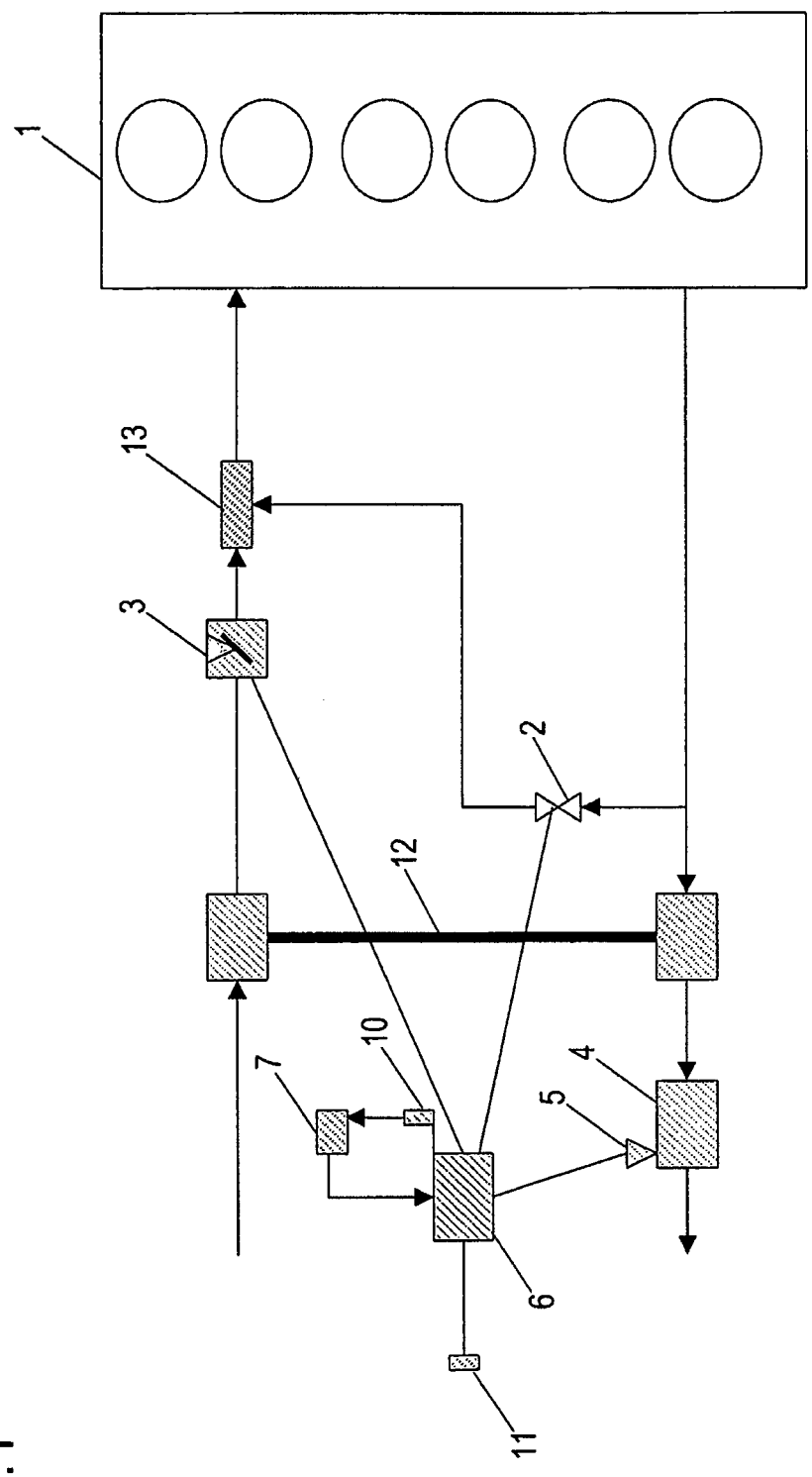
FIG. 1 shows a combustion engine according to the present invention.

FIG. 1 shows a combustion engine 1 having an EGR valve 2 that is configured between the induction tract and the exhaust tract of combustion engine 1. In addition, combustion engine 1 has a throttle valve 3 in the induction tract.

Located in the exhaust tract of combustion engine 1 is an exhaust system, respectively particulate filter and/or a catalytic converter. Situated in the exhaust tract, particularly in the region of the particulate filter, is an NOx sensor 5. A control device 6 communicates with EGR valve 2, throttle valve 3, NOx sensor 5 and physical model 7, as well as with correction module 10 and data interface 11.

Figure 2:
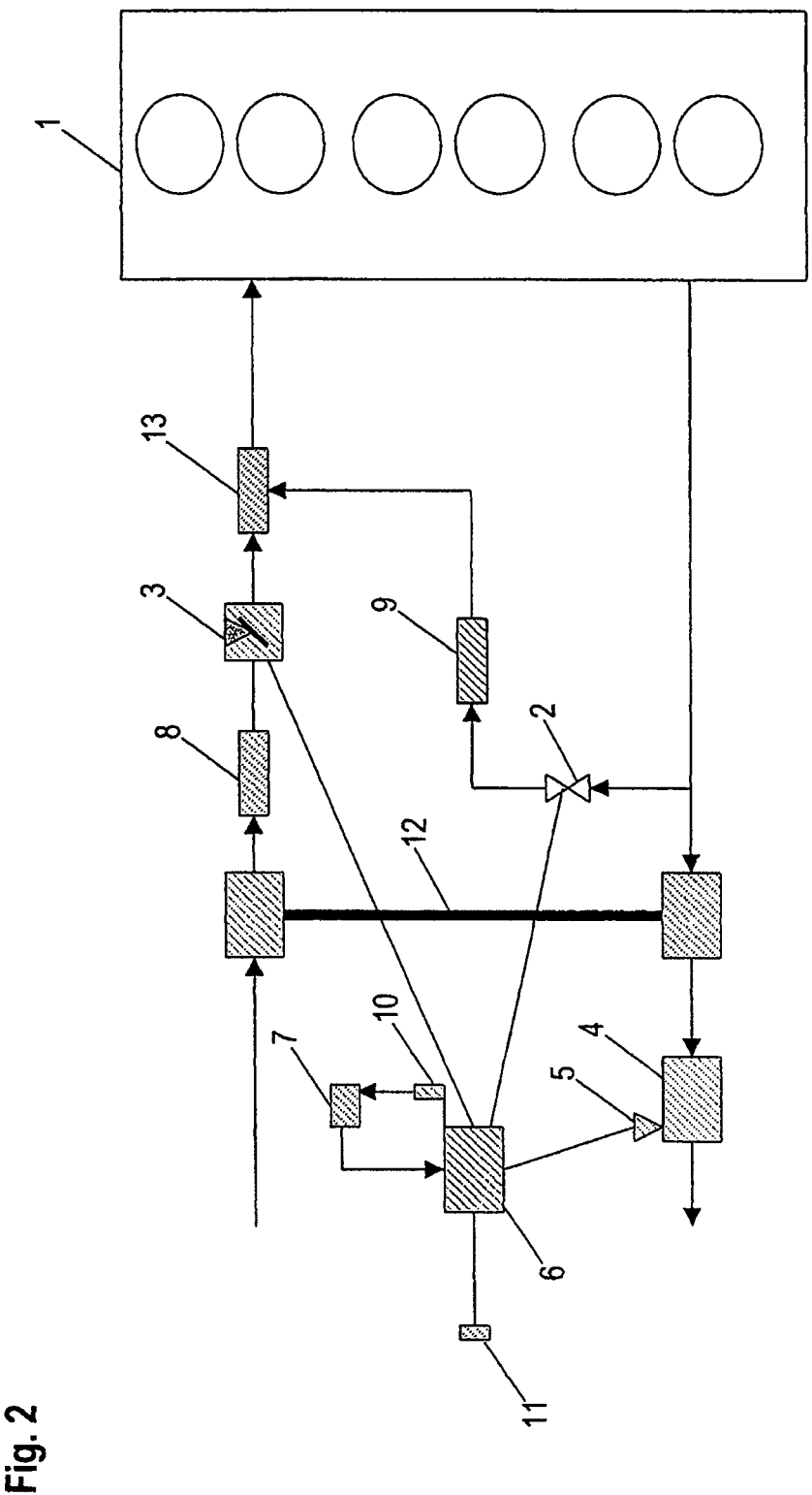
FIG. 2 shows another embodiment of a combustion engine according to the present invention.

FIG. 2 shows a combustion engine 1 having a charge-air intercooler 8, EGR cooler 9 and a turbocharger 12. Combustion engine 1 has an EGR valve 2 configured between the induction tract and the exhaust tract of combustion engine 1. In addition, combustion engine 1 has a throttle valve 3 in the induction tract.

Located in the exhaust tract of combustion engine 1 is an exhaust system, respectively particulate filter and/or a catalytic converter. Situated in the exhaust tract, particularly in the region of the particulate filter, is an NOx sensor 5. A control device 6 communicates with EGR valve 2, throttle valve 3, NOx sensor 5 and physical model 7, as well as with correction module 10 and data interface 11.

During a predetermined period of time following determination of an NOx value of the values for controlling EGR valve 2 and or the throttle valve 3, a mathematical model is used into which are entered the currently ascertained NOx values, the period of time that has elapsed since the completion of the NOx measurement, and the parameters of the combustion engine 1 relevant for the NOx reduction. The predetermined period of time may be the time that elapses following the completion of a preceding NOx measurement until the controlling step is implemented. The period of time may be defined as r=response time+5*delay time. In particular, the current state of the NOx content, respectively current NOx concentration in the exhaust gas is determined and stored on the basis of the physical model 7 of the combustion engine 1, which is operated in parallel to the mathematical model. The control device 6 may continually compare the mathematical to the physical model 7 as a function of the operating state of the combustion engine 1. The control device 6 may select the lowest NOx prediction of the mathematical model or the physical model 7 as a function of the operating state of the combustion engine 1, and convert it into corresponding control signals, in particular for the EGR valve 2 and/or the throttle valve 3.

| Symbols | |
|---|---|
| $a_{j,k}$ | element j, k of the output matrix |
| a | operating-point envelope element a from the output matrix |
| b | operating-point envelope element b from the output matrix |
| c | operating-point envelope element c from the output matrix |
| d | operating-point envelope element d from the output matrix |
| a' | subsequent value operating-point envelope element a from the output matrix |
| b' | subsequent value operating-point envelope element b from the output matrix |
| c' | subsequent value operating-point envelope element d from the output matrix |
| d' | subsequent value operating-point envelope element d from the output matrix |
| $\Delta a$ | difference from the subsequent value and current value for operating-point envelope element a from the output matrix |
| $\Delta b$ | difference from the subsequent value and current value for operating-point envelope element b from the output matrix |
| $\Delta c$ | difference from the subsequent value and current value for operating-point envelope element c from the output matrix |
| $\Delta d$ | difference from the subsequent value and current value for operating-point envelope element d from the output matrix |
| ga | weighting factor for element a |
| gb | weighting factor for element b |
| gc | weighting factor for element c |
| gd | weighting factor for element d |
| $\Delta G$ | sum from $\Delta a$, $\Delta b$, $\Delta c$ and $\Delta d$ |
| x | input variable for x |
| y | input variable for y |
| x | x-axis |
| y | y-axis |
| z | matrix for output values (output matrix) |
| Z | interpolated value from the output matrix |
| Z' | interpolated value from the subsequent values of the output matrix |
| $\Delta Z$ | difference from Z' and Z |

LIST OF REFERENCE NUMERALS 1 combustion engine
2 EGR valve
3 throttle valve
4 exhaust system, respectively particulate filter or a catalytic converter
5 NOx sensor
6 control device
7 physical model
8 charge-air intercooler
9 EGR cooler
10 correction module
11 data interface
12 turbocharger

What is claimed is:

1. A method for exhaust-gas recirculation (EGR) of exhaust gas from an internal combustion engine, comprising:
controlling an EGR valve and/or a throttle valve, during a predetermined period of time following determination of an NOx value of values for controlling the EGR valve and/or the throttle valve, using a mathematical model, wherein currently ascertained NOx values, a period of time that has elapsed since a completion of a NOx measurement, and parameters of the internal combustion engine relevant for NOx reduction are entered into the mathematical model, the mathematical model providing an output value for controlling the EGR valve and/or the throttle valve by adapting a plurality of output elements, wherein the adapting the plurality of output elements includes providing a weighting factor for each output element.

2. The method as recited in claim 1 wherein the method is for reducing NOx emission.

3. The method as recited in claim 1 wherein the predetermined period of time is a time that elapses following the completion of a preceding NOx measurement until the controlling step is implemented.

4. The method as recited in claim 1 wherein the period of time is defined as r=response time+5*delay time.

5. The method as recited in claim 1 wherein a current state of NOx content or a current NOx concentration in the exhaust gas is determined and stored on a basis of a physical model of the combustion engine, the physical model being operated in parallel to the mathematical model.

6. The method as recited in claim 5 wherein essentially all available engine-specific measured values in the physical model are recorded and stored as a function of all available operating parameters.

7. The method as recited in claim 5 wherein a control device continually compares the mathematical to the physical model as a function of an operating state of the combustion engine.

8. The method as recited in claim 1 wherein a control device continually compares and/or stores an NOx prediction of the mathematical or a physical model as a function of an operating state of the combustion engine.

9. The method as recited in claim 1 wherein a control device selects a lowest NOx prediction of the mathematical or a physical model as a function of an operating state of the combustion engine, and converts it into corresponding control signals for the EGR valve and/or the throttle valve.

10. The method as recited in claim 1 wherein the output elements are interpolated to provide the output value.

11. An internal combustion engine comprising:
    at least one exhaust tract;
    at least one induction tract;
    at least one of an EGR valve and a throttle valve;
    at least one exhaust system;
    at least one NOx sensor; and
    at least one controller controlling the at least one of the EGR valve and the throttle valve, during a predetermined period of time following determination of an NOx value of values for controlling the EGR valve and/or the throttle valve, using a mathematical model,
    wherein currently ascertained NOx values, a period of time that has elapsed since a completion of a NOx measurement, and parameters of the internal combustion engine relevant for NOx reduction are entered into the mathematical model, the mathematical model providing output values for controlling the EGR valve and/or the throttle valve by adapting a plurality of output elements,
    wherein the adapting the plurality of output elements includes providing a weighting factor for each output element.

* * * * *